No. 746,630. PATENTED DEC. 8, 1903.
E. T. GREENFIELD.
ARMORED HOSE AND METHOD OF MAKING SAME.
APPLICATION FILED APR. 29, 1903.
NO MODEL.
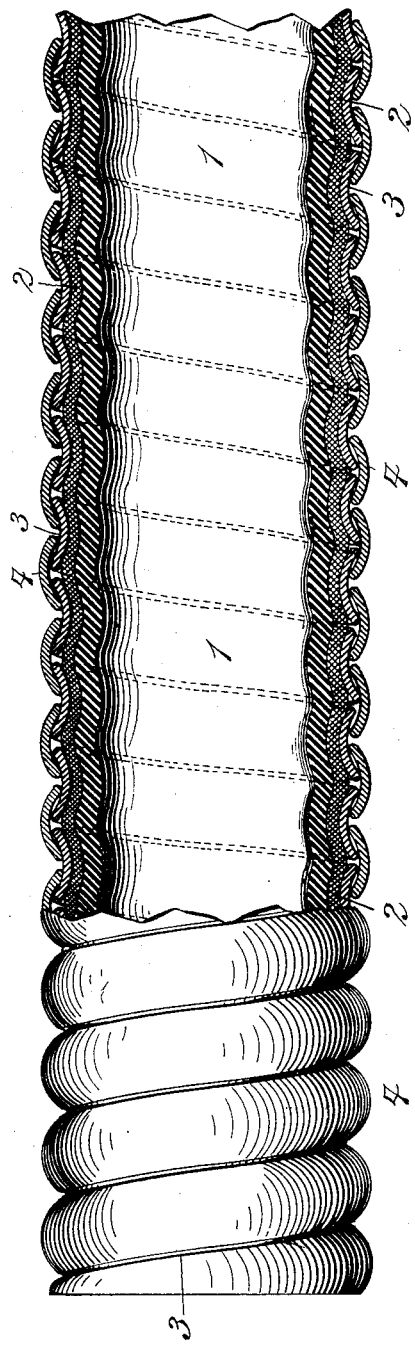
Witnesses
Edward Rowland
M. F. Keating
Inventor
Edwin T. Greenfield
By his Attorney
Charles J. Kintner No. 746,630. Patented December 8, 1903.

UNITED STATES PATENT OFFICE.

EDWIN T. GREENFIELD, OF MONTICELLO, NEW YORK.

ARMORED HOSE AND METHOD OF MAKING SAME.

SPECIFICATION forming part of Letters Patent No. 746,630, dated December 8, 1903.

Original application filed March 10, 1903, Serial No. 147,070. Divided and this application filed April 29, 1903. Serial No. 154,777. (No model.)

*To all whom it may concern:*

Be it known that I, EDWIN T. GREENFIELD, a citizen of the United States, residing at Monticello, in the county of Sullivan and State of New York, have made a new and useful Invention in Armored Hose and Methods of Making the Same, of which the following is a specification.

My invention has for its objects, first, to devise a flexible armored hose which shall be possessed of enormous strength; second, to devise a flexible armored hose of such a nature that it may be bent to any desired angle and for an indefinite number of times without danger of rupturing or materially weakening it; third, to so devise an armored hose that the interior or steam-tight lining thereof may be removed when damaged and replaced by a new lining, thus avoiding the necessity of abandoning the entire structure, as is now generally done.

To this end my invention consists, first, in the novel method of constructing such a hose, and, second, the novel armored hose as thus constructed, the essential points of novelty of my invention being particularly pointed out in the claims at the end of the specification.

Prior to my invention it was customary to construct flexible hose such as is used in connection with steam fire-engines, on railway-trains, or in places generally where flexible hose of high resisting capacity is required, of rubber and a woven or braided fabric, said fabric being generally located in one or more layers within the body of the rubber and the entire structure surrounded by a very strong braided or woven fabric. All such hose, however, in so far as it has been found possible to make the same reasonably practical, will rupture from abnormal pressures, such as are often encountered in the use of steam and air under pressure, and particularly in connection with steam fire-engines or in mining operations where pneumatic and hydraulic apparatus is used with air or water at high pressures and heads in effecting the results sought. All such hose is also open to the further objection that if bent in short curves it will crack or break after a time or the body thereof become so materially weakened that it will ultimately burst at the point where the bend has been effected. Such hose is also usually not repairable. My novel hose, hereinafter described, is designed to overcome all of these objections.

For a full and clear understanding of the invention, such as will enable others skilled in the art to construct and use the same and to practice the method of manufacturing my novel form of hose, reference is had to the accompanying drawing, which is a part plan, part sectional view, of a short piece of my novel hose full size.

Referring to the drawing in detail, 1 represents a pipe or tube, preferably of rubber or such yielding material as is water-tight and steam-tight, and 2 an exterior pipe or tube made preferably of braided cotton or analogous fabric and such as ordinarily constitutes the exterior of existing forms of high-pressure hose.

3 4 represent an exterior armor composed of interlocking metal strips secured about the outer pipe or tube 2 and of spiral form and in the same manner as the like interlocking armor is formed around a pipe, tube, or cable, as disclosed in a number of United States patents heretofore granted to me and particularly effected by the mechanism disclosed in United States Patent No. 630,502, granted to me on the 8th day of August, 1899.

In constructing this armored hose I prefer to have the lengths of the flexible pipes or tubes 1 and 2 somewhat greater than the length of the united interlocking armor-strips taken in the direction of the axis of the hose for a purpose which will now be described, and which constitutes a part of the method of constructing the hose. After the hose is armored it is connected directly to a source of steam, air, or gas and subjected to a very high pressure sufficient to give to the combined pipe or tube 1 2 spiral or lateral corrugations corresponding to the corrugations of the spiral armored strips 3 4. The length of time for which the pipe must thus be subjected to pressure in order to effect the "set" will naturally depend upon the thickness of the pipes or tubes 1 2, the diameter of the hose itself, the nature of the rubber, the heat of the steam, and other elements of structure, which will be apparent to those skilled in the art.

I have ascertained that for ordinary steam-hose of the dimensions illustrated in full size in the drawing and in such lengths as it may be desirable to construct a pressure of one hundred pounds per square inch for one hour will give the desired result. After the hose has been thus tested and set it is ready for the market, and as constructed is of such a nature that it may be readily bent to any desired curvature and an indefinite number of times without in the slightest degree impairing it or weakening any part thereof. In the producing of this set effect it will now be apparent why it becomes necessary to insert such pipes as of greater length than the armor.

Although I have described a method of making my novel armored steam-tight hose by placing the armor around either single or double tubes of flexible material and then effecting a setting of the flexible tubes, so that they assume a corrugated interior, I may vary and in fact prefer to vary from this method in the construction of relatively short lengths of such armored hose—such, for instance, as are used on railway-trains for steam and air coupling-pipes. To illustrate, I draw the rubber lining inside the braided-fabric tube and then draw both into the flexible armor-tubes, such armor-tubes being on sale and in general use and known as the "Greenfield" flexible armor-tubes for electric wiring. After the two tubes are thus drawn within the armor they are subjected to a high internal pressure by steam and given a set and corrugated effect as before. Such armored hose may also be readily repaired by stripping out the inner or rubber tube when it is damaged and a new lining-tube be inserted and set or corrugated, as before.

It will be apparent that the interlocking nature of the armor-strips and the relation of the set or corrugated hose therein are such that the armor prevents any undue stress upon the hose when subjected to short bends, and in this feature is found one of the important benefits of my novel hose.

I do not limit my invention to the detailed structural arrangement of all of the parts as hereinbefore described and as illustrated in the accompanying drawing, as a number of the features thereof might be materially departed from and still come within the scope of my claims hereinafter made. I believe it is broadly new with me to construct a flexible armored hose in such manner that the yielding or flexible part thereof may be bent or kinked an indefinite number of times without damaging effect of the yielding parts thereof beneath the armor, and my claims are generic both as to the structural form of such a hose and as to the method of making the same.

Having thus described my invention, what I claim, and desire to secure by Letters Patent of the United States, is—

1. The described method of making a flexible armored hose consisting in surrounding a flexible steam or water tight tube with an armor corrugated transversely to the length of the tube and then subjecting the latter to sufficient interior pressure to give to it transverse corrugations similar to those of the armor.

2. The described method of making a water or steam tight hose consisting in surrounding one or more flexible water or steam tight tubes with a flexible corrugated armor and then subjecting the interior of the hose to pressure and heat until it assumes a corrugated "set" similar to that of the armor.

3. An armored hose, both the hose and the armor having corrugations substantially transverse to the axis thereof.

4. An armored hose consisting of a flexible tube and an armor corrugated substantially transverse to the axis of the hose; the tube being corrugated similarly.

5. A flexible hose having an armor composed of two interlocking spirally-wound strips of metal, the hose having corrugations corresponding to the interior conformation of the armor.

6. A flexible hose composed of an inner tube of rubber; a surrounding tube of fabric, such as braided cotton, and an armor of interlocking metallic strips spirally disposed therearound, the inner tubes being given "set" corrugations from within which correspond to the spiral corrugations of the armor.

In testimony whereof I have signed my name to this specification in the presence of two subscribing witnesses.

EDWIN T. GREENFIELD.

Witnesses:
 C. J. KINTNER,
 M. F. KEATING.